United States Patent [19]

Kaminow

[11] Patent Number: 5,077,728
[45] Date of Patent: Dec. 31, 1991

[54] FREQUENCY DIVISION MULTIPLE ACCESS NETWORK

[75] Inventor: Ivan P. Kaminow, Holmdel, N.J.

[73] Assignee: AT&T Bell Laboratories, Murray Hill, N.J.

[21] Appl. No.: 453,511

[22] Filed: Dec. 20, 1989

[51] Int. Cl.⁵ .............................................. H05J 1/00
[52] U.S. Cl. .................................... 359/124; 359/121
[58] Field of Search ..................... 370/3, 9, 84, 57, 60, 370/; 455/612, 606, 608, 615, 617, 609, 611, 602, 607; 350/96.11

[56] References Cited

U.S. PATENT DOCUMENTS

| | | | |
|---|---|---|---|
| 4,726,011 | 2/1988 | Ih et al. | 455/617 |
| 4,856,093 | 8/1989 | Mohr | 455/611 |
| 4,873,681 | 10/1989 | Arthurs et al. | 370/3 |

FOREIGN PATENT DOCUMENTS

| | | | |
|---|---|---|---|
| 0319242 | 6/1989 | European Pat. Off. | 370/3 |
| 0790215 | 10/1980 | United Kingdom | 370/3 |

OTHER PUBLICATIONS

IBM Technical Disclosure Bulletin, vol. 30, No. 9, Feb. 1988, pp. 262-266.

*Primary Examiner*—Curtis Kuntz
*Assistant Examiner*—Kinfe-Michael Negash
*Attorney, Agent, or Firm*—Eli Weiss

[57] ABSTRACT

An N×N passive star coupler can be used to provide a high performance optical data network to interconnect many users at gigabit rates. Ignoring excessive losses, a signal incident on any input port is divided equally between all of the output ports. The average power at all of the input ports N of the star is equal to the average power at all of the output ports N. But, the power per channel at each output port is equal to only 1/N of the applied power. This loss which is due to splitting cannot be recovered by an amplifier at either the input port or the output port of the star coupler unless the amplifier saturation power is greater than the transmitter power. This invention solves the problem of amplifier saturation. Briefly, a discrete optical frequency signal which, when combined in the star coupler produces identical frequency division multiplex spectra at each output port is applied to each input port of the passive star coupler and tunable fiber Fabry-Perot filters are coupled to the output ports of the star coupler. The optical filters select the various channels. An amplifier is positioned downstream of each optical filter. By placing the amplifiers after the optical filter, the power level applied to the amplifier is substantially 1/(2N) of the transmitter power and saturation of the amplifier is minimized as a constraint.

2 Claims, 4 Drawing Sheets

FREQUENCY DIVISION MULTIPLE ACCESS NETWORK

TECHNICAL FIELD

This invention relates to the field of non-coherent networks and, more particularly to a high throughput optical frequency division multiplexed network.

BACKGROUND OF THE INVENTION

In multiple access networks, the various stations normally consist of a transmitter and a receiver. They are usually located within a limited range of ten kilometers or less and any station may be connected to any other station. For a passive network, the distribution requirements are efficiently realized with a star coupler.

Workstations, which will normally include a transmitter and a receiver, can be located in various rooms of a building or various buildings on a campus. If each of the transmitters operates with a different optical carrier frequency, then the complete comb of signals will appear at each output port of the star. Thus, each receiver has access to each transmitter in the same manner that a radio receiver has access to the entire broadcast spectrum.

An N×N passive star coupler can be used to provide a high performance optical data network to interconnect many users at gigabit rates. Ignoring excess losses, a signal incident on any input port is divided equally among all the output ports. The average power at each of the N output ports of the star is equal to the incident power at each of the N input ports. But, the power per channel at each output port is equal to only 1/N of the incident power in that channel. This loss which is due to splitting cannot be efficiently recovered by an amplifier at either the input port or the output port of the star coupler unless the saturation power of the amplifier is increased to be substantially N times the value of the power transmitted. A simple and economical arrangement for demultiplexing the various channels is also needed.

SUMMARY OF THE INVENTION

This invention solves the above noted problem of amplifier saturation by coupling optical frequency division multiplexed signals with either frequency, phase or amplitude shift keyed modulation format or analog amplitude modulated signals or frequency modulated signals to the input ports of a passive star coupler and using tunable optical filters at the outputs of the star coupler. The filters select the various channels. An amplifier can be placed downstream of each optical filter.

BRIEF DESCRIPTION OF THE DRAWING

A more complete understanding of the invention may be obtained by reading the following description of a specific illustrative embodiment of the invention in conjuntion with the appended drawings in which.

DETAILED DESCRIPTION

Figure 1:
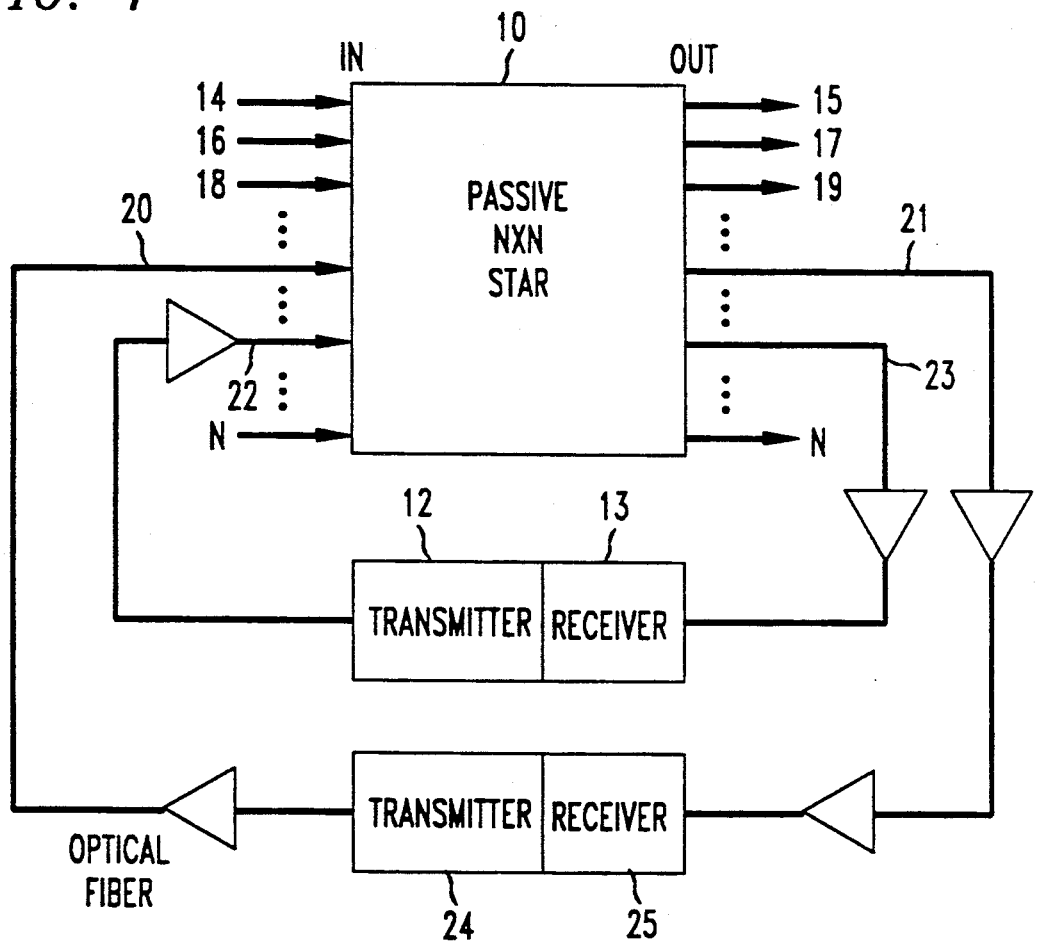
FIG. 1 is a schematic diagram of a multiple access network having a passive star coupler and transmitters coupled to the input ports and receivers coupled to the receiver ports.

Referring to FIG. 1 the ideal passive star coupler 10 has the property that a signal incident on any of the N input ports is divided equally among all of the N output ports. Thus, a signal from transmitter 12 which is applied to input port 22 will appear on output port 23 but its power will be reduced by the fraction 1/N.

The maximum network throughput for the lossless passive star in terms of the average power from each transmitter $P_T$ and the receiver sensitivity E in photons/bit is $$P_T/N = (hc/\lambda)EB$$

where the photon energy is $hc/\lambda$, where $hc = 2 \times 10^{-19}$ J $\mu$m; h being Planck's constant, c the velocity of light and $\lambda$ the wavelength. B is the bit rate and N is the number of input or output ports of the star coupler.

Rearranging, the network throughput is $$BN = \frac{P_T}{(hc/\lambda)E}.$$

From this relationship, with the modest parameters of $P_T = 1$ mW and $E = 10^3$ photon/bit at $\lambda = 1.53 \mu$m, the capacity is 7.7 Tb/S.

Excess loss in the star coupler and attenuation in the fibers will reduce the capacity. But, the network device parameters introduce a more immediate constraint.

In FIG. 1, each station includes a transmitter and a receiver. A first station includes a transmitter 12 and a receiver 13; and another station includes a transmitter 24 and a receiver 25. In FIG. 1, if each of the transmitters 12, 24 operates at a different optical carrier frequency $f_i$, then the complete comb of signals will appear at each output port 15, 17, 19, 21, 23 ... N, of the star. Power margin between the transmitter and receiver sensitivity is required primarily to allow for the splitting losses in the star coupler. Optical heterodyne receivers are about 10 dB more sensitive than direct-detection receivers but require the added cost and complexity of a high-power, tunable optical local oscillator as well as polarization diversity or control of the signal to assure efficient mixing with the local oscillator. An optical preamplifier in front of a direct-detection receiver can provide similar 10 dB sensitivity improvement at lower cost.

The simplest approach to a non-coherent frequency division multiplexed (FDM) network is to use amplitude-shift keying (ASK) as the modulation format and a tunable optical filter to select the channel at the receiver. For direct modulation of a semiconductor laser, chirping spreads the effective channel bandwidth well beyond the transform limit, reducing the allowable channel spacing ($f_c$). Chirping effects can be avoided, without the expense of an external modulator, by employing optical frequency-shift-keying. The single-frequency semiconductor laser is dc-biased to produce an optical frequency representing the digital "0"s and a small current increment is added to increase the frequency by $f_d$, the deviation frequency, to represent the "1"s. In effect, the chirping is harnessed to provide the coding without the excessive spreading encountered when the current swings from near threshold to its on-state as in direct ASK modulation. Since the optical phase varies continuously with direct current, the modulation is denoted continuous phase FSK (CPFSK), and provides a more compact spectrum than switching between independent oscillators representing "0"s and "1"s. Direct-modulation CPFSK has the inherent advantage of a narrower-band power spectrum both because of the ease of controlling $f_d$ and the absence of discontinuities in phase or amplitude at the bit boundaries, thus allowing closer channel spacing.

The average power spectrum calculated for a large deviation index random CPFSK signal consists of two peaks separated by $f_d$. For $u >> 1$, where $$u = f_d/B.$$

The FSK spectrum is approximately the superposition of two ASK spectra centered on the "1" and "0" frequency tones, respectively. Calculations assume a discrete frequency jump between "0" and "1" bits at the time-slot boundary but with a continuous optical field at the boundary. Thus, for $\mu$ an integer, all of the "1" bits and all of the "0" bits, respectively, will be in phase and the power spectrum will contain delta-functions at the "1" and "0" tones. For a general value of $\mu$, the bulk of the energy in each peak is contained within a width equal to the bit-rate B.

Figure 2:
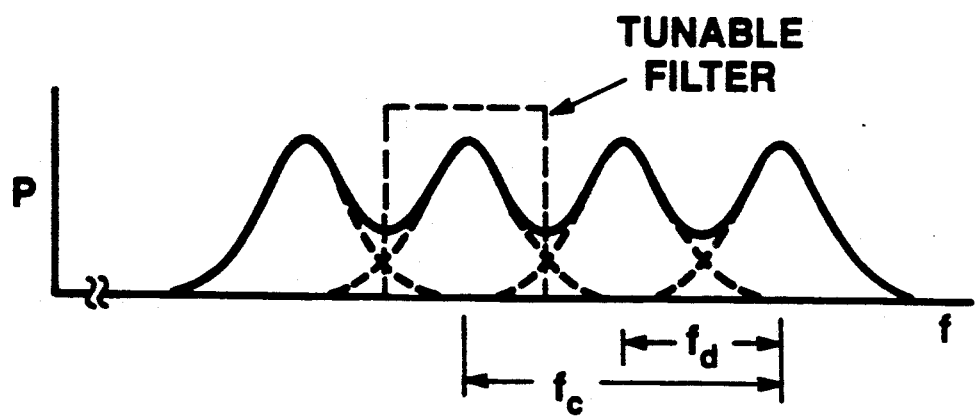
FIG. 2 is a graph of the power vs. frequency spectrum of a multichannel FDM-FSK.

Thus, referring to FIG. 2, a channel can be selected and the FSK signal converted to an undistorted ASK signal by a bandpass filter of width B, tuned to the "1" or "0" peak and positioned in front of the detector. The modulations index $\mu$ should be sufficiently large to reduce cross-talk between "0"s and "1"s due to the overlap of the wings of their spectra. It is to be noted that, in the interest of simplicity, half of the signal is discarded, although it is possible to regain this lost signal with added receiver complexity. Still, the received power is not less than for the same transmitter laser when ASK is provided by direct or external modulation, since a laser is usually peak-power limited.

In the multichannel FDM-FSK spectrum of FIG. 2, the wing of the "0" peak in the next higher frequency channel can introduce cross-talk unless the channel spacing $f_c$ is sufficiently large. An estimate of the cross-talk effects for random FSK spectra shows that the maximum channel density occurs for $f_c = 2f_d$ and that a Fabry-Perot filter with a —3 dB passband characteristic of B allows a minimum spacing $f_c = 6B$ with negligible (0.1 dB) power penalty. A sharper cut-off filter, as provided by two similar Fabry-Perots in tandem, allows a closer spacing, $f_c = 3B$.

Figure 3:
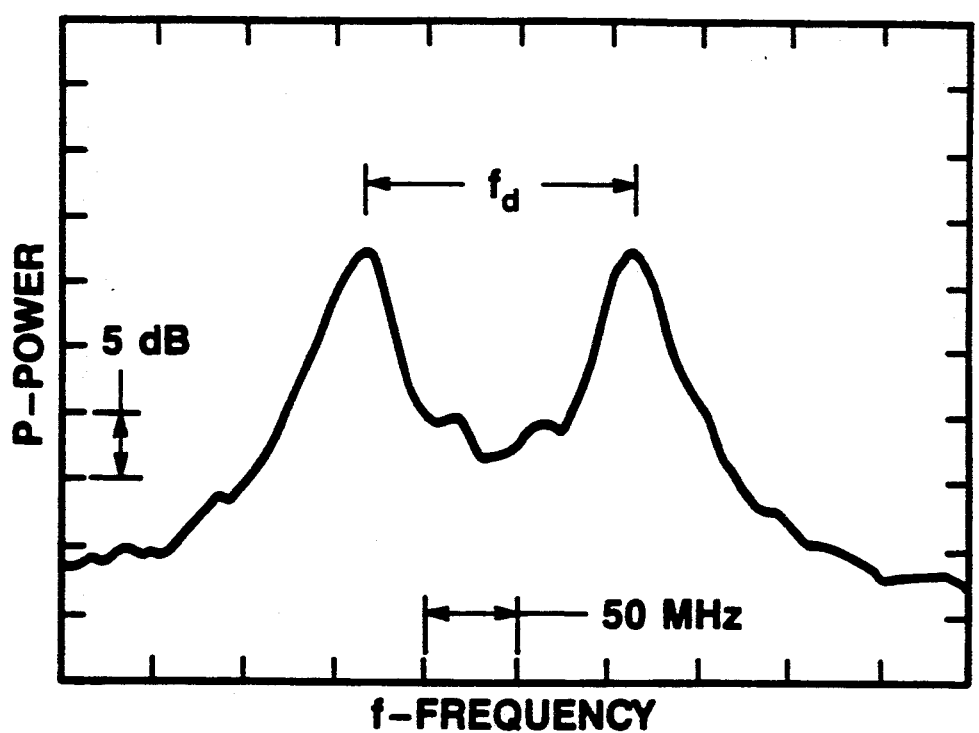
FIG. 3 is a graph of the actual power vs. frequency spectrum of a laser.

Optical FSK can be obtained by current modulation of a single-frequency laser about a larger dc level. The change in current density modulates the refractive index of the waveguide and the Bragg wavelength of the frequency-selecting grating. Since the time constant for carrier-density change may be comparable to the bit period, the actual FSK spectrum may have excess energy between the peaks, corresponding to less-than-maximum frequency deviations. Furthermore, this finite time constant together with the finite laser linewidth tends to spread out the delta-function narrowing near integral $\mu$. FIG. 3 illustrates the actual power spectrum for a laser modulated at 45Mb/s with $\mu = 3.4$. Thus, in an FDMA-FSK network, a tunable filter can operate as both a demultiplexer and an FSK-to-ASK converter.

Figure 4:
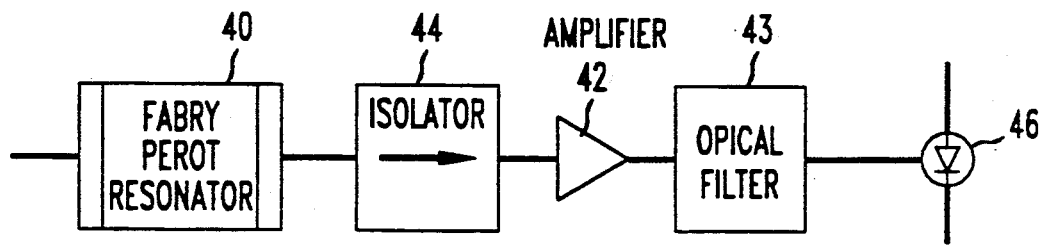
FIG. 4 is a schematic of an embodiment of a filter receiver in accordance with the principles of the invention.

Referring to FIG. 4, there is illustrated a receiver comprising an isolator 44, a tunable fiber Fabry-Perot resonator 40, an amplifier 42, an optical filter 43 and a detector 46. The output signal from the tunable Fabry-Perot filter 40 can be applied through the isolator 44, the amplifier 42 and the fixed optical filter 43 to the detector 46. The isolator 44 prevents oscillations and feedback of spontaneous emission noise and the filter 43 reduces spontaneous emission noise from the amplifier. The optical amplifier 42 serves as a low-noise preamplifier with gain adjusted such that the signal-spontaneous noise is the dominant noise term. It is to be noted that the amplifier 42 is positioned downstream of the Fabry-Perot filter 40. By placing the amplifier after the Fabry-Perot filter, the power level applied to the amplifier is substantially 1/(2N) of the transmitter power and saturation of the amplifier is minimized as a constraint. The reason for the reduced power level is that the filter passes only the "1" (or the "0") bits of only one of the N channels.

Referring to FIG. 1, gain saturation constraints influence the location of an amplifier in a star network. Ignoring excess losses, the power levels are the same at all the input and output ports. Thus, amplifiers placed at the input or output ports of the star or at the transmitter or receiver serve as power amplifiers and can compensate for excess losses in the star coupler and attenuation in the transmission fibers. But, they cannot overcome splitting losses unless their output saturation power is substantially greater than the transmitter power. Placing all the amplifiers near the star rather than at each of the different stations may ease their maintenance procedures.

But, as illustrated in FIG. 4, by placing the amplifier after the Fabry-Perot filter, the power into the amplifier is less than 1/(2 N) of the transmitter power and saturation is minimized as a constraint.

Present day optical amplifiers are bidirectional and, therefore, non-reciprocal isolators can be used to prevent self-oscillation, particularly in the presence of the large off-resonance reflectivity of the fiber Fabry-Perot filter. The isolator 44 also prevents reflections from reaching the transmitter laser and, thus, reduces intensity noise.

Figure 5:
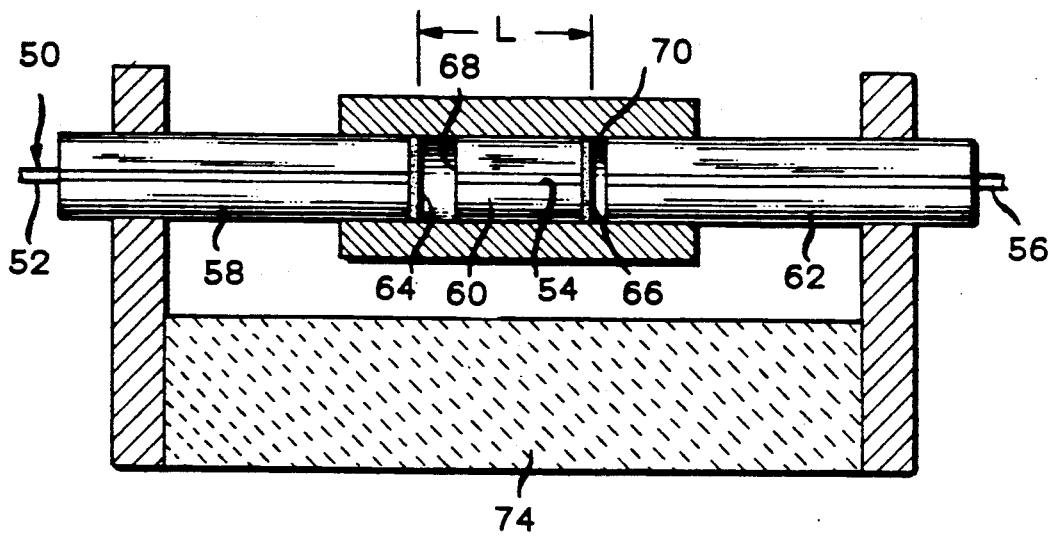
FIG. 5 is a schematic diagram of a tunable fiber Fabry-Perot filter.

A tunable Fabry-Perot filter is illustrated in FIG. 5. A fiber 50, cut to form three sections 52, 54, 56, is cemented into three glass ferrules 58, 60, 62 and the ends are polished flat. High-reflecting dielectric mirrors 64, 66 are applied to an end face of glass ferrule 58 and 54, and anti-reflection coatings are applied to the opposing faces 68, 70. Glass ferrule 60 is then cemented to glass ferrule 62. A gap between glass ferrules 58, 60 is set to be approximately 1 $\mu$m; and the spacing between the mirrors 64, 66 is designated. The three glass ferrules are positioned within and maintained in alignment by a precision split sleeve 72. A stacked piezoelectric transducer 74 is coupled to glass ferrules 58, 62 by a convenient coupling member to vary the spacing L by changing the size of the gap between ferrules 58 and 60. In one embodiment, a potential of approximately 10 volts applied to the piezoelectric transducer 74 scanned through one Free Spectral Range of the Fabry-Perot filter.

The fiber Fabry-Perot filter illustrated in FIG. 5 operates well for lengths in the 0.1 to 10 mm range, providing a Free Spectral Range from 1000 to 10 GHz. Designs for other Free Spectral Ranges disclosed in Electronics Letters, 23, pp. 781-783 (1987) entitled "Pigtailed High-Finesse Tunable Fibre Fabry-Perot Interferometers with Large, Medium and Small Free Spectral Ranges" by J. Stone et al, have given good results. For many network applications, such as packet switching, fast tuning is desirable. Piezoelectric response limits speeds to approximately $10^{-5}$s. Higher speeds, for example approximately 1ns can be obtained with narrowband tunable optical amplifiers based on the multi-electrode DFB or DBR laser employed as a tunable filter with gain. In these devices, the tuning ranges are limited.

Figure 6:
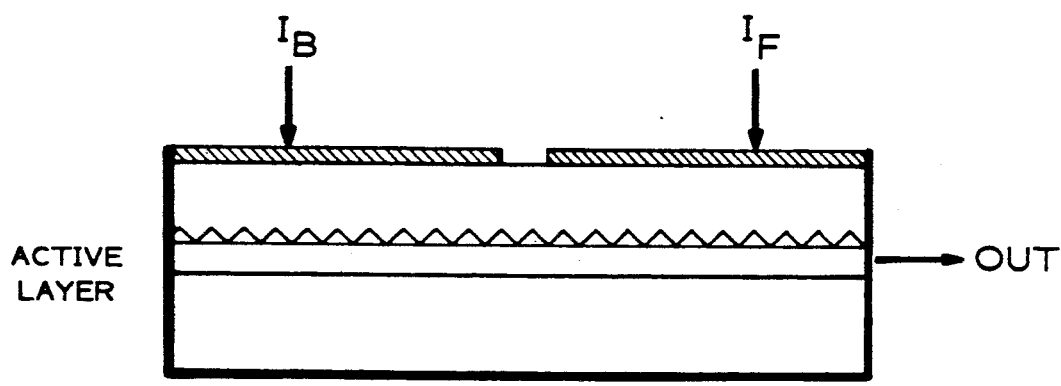
FIG. 6 is a schematic diagram of a distributed feedback laser.
Figure 7:
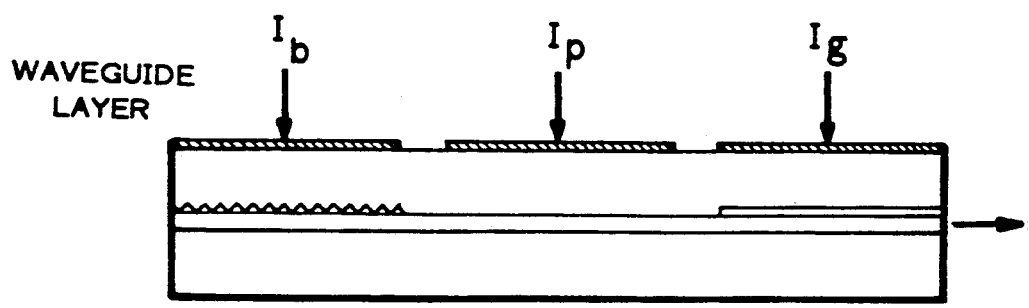
FIG. 7 is a schematic diagram of a distributed bragg reflector laser.

A Distributed Feedback (DFB) laser FIG. 6 and a Distributed Bragg Reflector (DBR) laser FIG. 7 are single-frequency lasers which contain a Bragg grating for determining the operating frequency. Electrons injected into the grating and waveguide regions change the refractive index which, in turn, tunes the Bragg wavelength of the grating or varies the optical path length in a waveguide. The optical frequency tunes continuously over a range of currents until a discontinuous jump of frequency to an adjacent longitudinal mode occurs. In the two-section DFB laser, FIG. 6, independent adjustments of the currents in the front $I_f$, and back, $I_b$, electrodes vary the Bragg-wavelengths and reflection phases of the two grating segments so as to tune the optical frequency. A continuous tuning range of 209 GHz (1.3 nm) at 1355 nm and 260 GHz (2.1 nm) at 1,550 nm with nearly constant power have been obtained.

The DBR laser illustrated in FIG. 7 is tuned by varying the currents in the Bragg ($I_b$), phase ($I_p$) and gain ($I_g$) regions. Continuous tuning ranges which extend up to 380 GHz (3.1 nm) and continuous coverage by overlapping single-longitudinal-mode regions up to 1,250 GHz (10 nm) at 1550 have been obtained.

An embodiment of the invention is disclosed above where frequency-shift keyed signals are frequency-division multiplexed. However, it is to be understood that amplitude shift keyed signals, phase shift keyed signals, analog amplitude modulated signals or frequency modulated signals which are frequency-division multiplexed can also be used with a star coupler and tunable optical filters at the output ports of the star coupler in accordance with the principles of the invention.

A 3 dB fiber directional coupler is a 2×2 star, and is commercially available with an excess loss (beyond the 3 dB splitting loss) of 0.1 dB. Four couplers spliced together, with a pair of fibers crossing, provides a 4×4 star. Stars of any even dimension can be pieced together in this fashion. For N ports, $q=\log_2 N$ ranks of 2×2 couplers with N/2 couplers in each rank is required. The excess loss is q times the loss of each coupler. However, for N≳16, the cost and complexity of fabrication becomes prohibitively high. Integrated optics techniques can be used to make waveguide directional couplers photolithographically on a large substrate, and these can be interconnected to realize a planar N×N star. However, care should be exercised to insure that the waveguide cross-overs occur at a large enough angle to avoid spurious cross-talk, which increases the coupler size.

Figure 8:
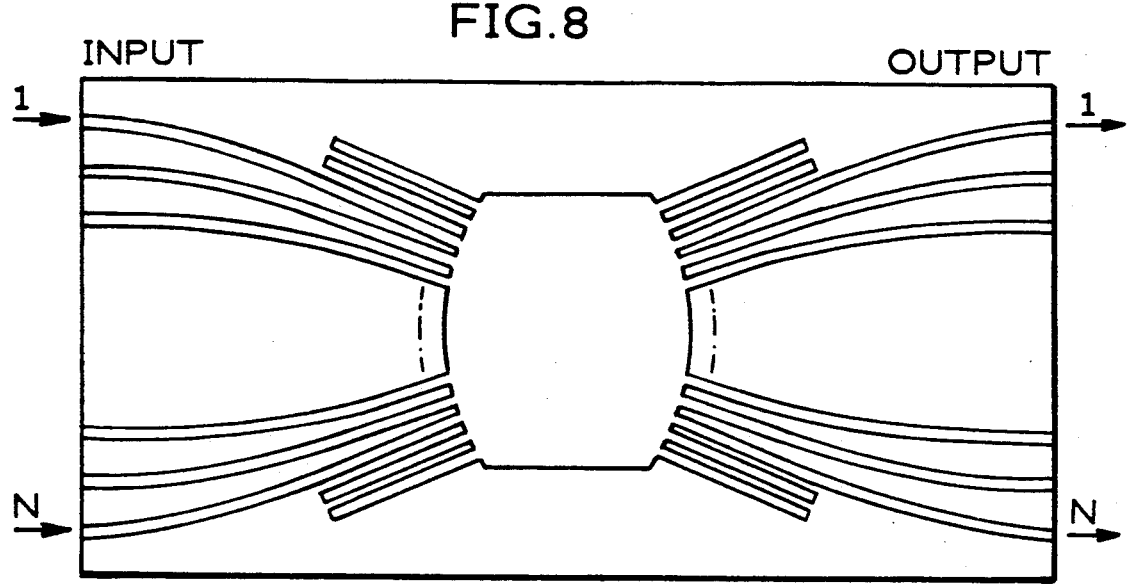
FIG. 8 is a schematic diagram of an integrated N×N star coupler which can be used.

An integrated star with a large number of ports N is illustrated in FIG. 8. It utilizes a planar input waveguide array that radiates into a planar "free-space" region, which is sufficiently long that the output array aperture is in the far field. If any one of the input guides is excited, it couples energy into the adjacent waveguides in such a way that the far-field is nearly uniform over the output guides. Excess loss becomes vanishingly small in the limit of long adiabatic coupling regions along the input and output arrays and small beam angle for the far field radiation pattern.

In an embodiment, a 19×19 star coupler with dimensions of about 1 cm×4 cm was fabricated using silica waveguides on a silicon substrate. The input and output waveguides were coupled to single-mode fibers. The excess loss at 1.3 µm for the central waveguide is 1.5 dB and, for the marginal waveguides, 3.5 dB. The excess loss includes 0.8 dB due to fiber coupling and 0.2 dB of silica waveguide loss. The uniformity of output excitations is thus ±1 dB. The average excess loss of 2.5 dB is acceptably small compared with the 1/N splitting loss of 13 dB. In addition, the excess loss should not increase for N≈100.

The low excess loss of this device is unexpected at first glance, especially when one considers the case of an isolated waveguide radiating into a free-space region and exciting an array of elements. In order to obtain a uniform excitation of the output array, a substantial portion of the energy in the single-element radiation pattern would spill-over the output array giving a large excess loss. However, using the formalism of infinite periodic structures and adiabatic waveguide transformations, it can be shown that mutual coupling of energy from the excited input waveguide to neighboring guides generates the correct excitation of array elements to generate a radiation pattern that is nearly uniform over a sector which includes the output array with very little spill-over outside this sector.

Figure 9:
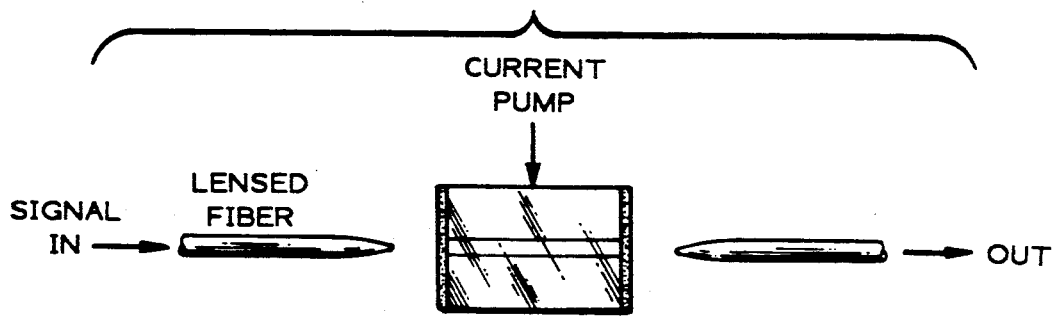
FIG. 9 is a schematic diagram of a semiconductor diode optical amplifier.

When the number of users (N) gets large (>100), the dividing losses in the star coupler or splitter severely limits the power margin. As noted earlier, this intrinsic loss and the excess losses can be made up, with certain limitations, by optical amplifiers that provide gain over the FDM band. Referring to FIG. 9, a semiconductor diode amplifier formed by anti-reflection-coating the end facets of the laser can provide 20 dB of gain over a 2,500 GHz (20 nm) band at a wide range of operating wavelengths with a saturation output power greater than 1 mW. The semiconductor amplifier saturates at about the same power as the laser diode from which it is fabricated, since the same gain process is involved.

Figure 10:
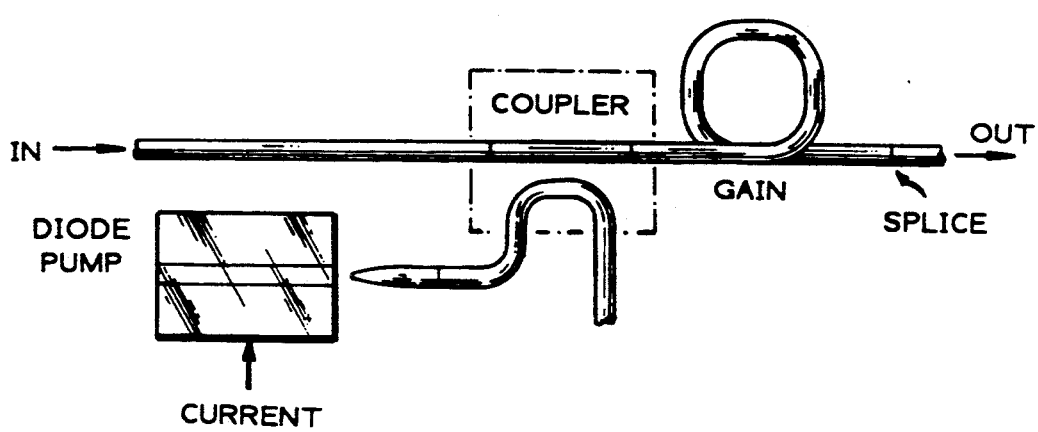
FIG. 10 is a schematic diagram of an erbium-doped fiber amplifier.

An optical fiber, doped with erbium ions and pumped by a suitable semiconductor laser, as illustrated in FIG. 10, can produce gain within a band (1,520-1,550 nm) fixed by the rare-earth ion and the host glass. Since erbium is a 3-level laser system, the saturation power increases linearly with the available pump power.

It has been found experimentally that the output saturation power is about ¼ the pump power. Thus, with large available pump powers, saturation need not limit the application of erbium-fiber amplifiers.

I claim:

1. A frequency division multiple access network comprising an N×N star coupler with N input ports and N output ports, each input port being coupled to receive a discrete optical frequency signal which, when combined in the star coupler produces identical frequency division multiplex spectra at each output port comprising:

a tunable optical filter coupled to an output port of said N×N star coupler to block all but one of the received optical signals of said frequency division multiplex spectra, an optical detector coupled to convert the optical signals from said tunable optical filter to electronic signals, an optical amplifier positioned between said tunable optical filter and said optical detector to receive and optically amplify said signals passed by said tunable optical filter, an isolator interposed between said optical amplifier and said tunable optical filter to inhibit oscillations and feedback of spontaneous emission noise, and an optical filter interposed between said optical amplifier and said optical detector to reduce spontaneous emission noise from said optical amplifier.

2. The structure of claim 1 characterized in that said tunable optical filter is a fiber Fabry-Perot resonator.

* * * * *